(12) United States Patent
Seike

(10) Patent No.: US 9,933,647 B2
(45) Date of Patent: Apr. 3, 2018

(54) DISPLAY DEVICES INCLUDING ORIENTED NUCLEIC ACID LAYERS AND METHODS OF MAKING AND USING THE SAME

(71) Applicant: Empire Technology Development LLC, Wilmington, DE (US)

(72) Inventor: Aya Seike, Toyko (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/786,473

(22) PCT Filed: May 8, 2013

(86) PCT No.: PCT/US2013/040158
§ 371 (c)(1),
(2) Date: Oct. 22, 2015

(87) PCT Pub. No.: WO2014/182297
PCT Pub. Date: Nov. 13, 2014

(65) Prior Publication Data
US 2016/0070040 A1    Mar. 10, 2016

(51) Int. Cl.
*G02F 1/1335* (2006.01)
*G02F 1/137* (2006.01)
(Continued)

(52) U.S. Cl.
CPC ......... *G02F 1/1335* (2013.01); *G02B 5/3008* (2013.01); *G02F 1/133* (2013.01); *G02F 1/13737* (2013.01); *G02F 1/133528* (2013.01); *G02F 1/133533* (2013.01); *G02B 5/204* (2013.01); *G02B 5/223* (2013.01); *G02F 1/133516* (2013.01); *G02F 2202/02* (2013.01)

(58) Field of Classification Search
CPC ...... G02F 1/133; G02F 1/1333; G02F 1/1335; G02F 1/133528; G02F 1/13737
See application file for complete search history.

(56) References Cited

U.S. PATENT DOCUMENTS

| | | |
|---|---|---|
| 3,485,752 A | 12/1969 | Ellen et al. |
| 4,779,957 A | 10/1988 | Suginoya et al. |

(Continued)

FOREIGN PATENT DOCUMENTS

| | | |
|---|---|---|
| EP | 1715376 | 2/2005 |
| JP | 06-212318 | 8/1994 |

(Continued)

OTHER PUBLICATIONS

Electronic Paper (from Wikipedia), information was available at website: Http://en.wikipedia.org/wiki/Electronic in some no later than Jul. 11, 2012.

(Continued)

*Primary Examiner* — Dung Nguyen
(74) *Attorney, Agent, or Firm* — Maschoff Brennan

(57) ABSTRACT

Display devices and color filtering layers having an oriented nucleic acid layer are disclosed. The display device can include a light-orienting layer disposed between an oriented nucleic acid layer and a polarizing layer. In some embodiments, polarizing layer may include an oriented nucleic acid layer. The color filtering layer can include an oriented nucleic acid layer and two or more pigments. Methods of making the color filtering layer are also disclosed.

20 Claims, 4 Drawing Sheets

(51) Int. Cl.
*G02F 1/133* (2006.01)
*G02B 5/30* (2006.01)
*G02B 5/20* (2006.01)
*G02B 5/22* (2006.01)

(56) References Cited

U.S. PATENT DOCUMENTS

| | | | |
|---|---|---|---|
| 7,535,545 | B2 | 5/2009 | Moon et al. |
| 7,771,802 | B2 | 8/2010 | Nakayama |
| 7,871,838 | B2 | 1/2011 | Moon et al. |
| 2004/0201795 | A1 | 10/2004 | Paukshto |
| 2005/0001954 | A1 | 1/2005 | Stephenson et al. |
| 2005/0181145 | A1 | 8/2005 | Sakano et al. |
| 2007/0132925 | A1 | 6/2007 | Nakayama |
| 2007/0285599 | A1 | 12/2007 | Oxude |
| 2009/0059367 | A1 | 3/2009 | O'Malley |
| 2010/0271573 | A1 | 10/2010 | Sakai |
| 2010/0288343 | A1 | 11/2010 | Sotzing et al. |
| 2011/0279374 | A1 | 11/2011 | Park et al. |
| 2012/0241590 | A1 | 9/2012 | Savoy et al. |

FOREIGN PATENT DOCUMENTS

| | | |
|---|---|---|
| JP | 06-242318 | 9/1994 |
| JP | 08-239398 | 9/1996 |
| JP | 2003-195001 | 7/2003 |
| JP | 2006-207010 | 8/2006 |
| JP | 2006-208010 | 8/2006 |

OTHER PUBLICATIONS

"Ashahi Glass Glass Plaza-PRO, Tips of glass (the strength of glass)", information was available at website: https://www.asahiglassplaza.net/gp-pro/knowledge/vol21.html, in some form no later than Jul. 11, 2012.

"Sharp: The world of LCD, How to make the Structure of the liquid crystal display", information was available at website: http://www.sharp.co.jp/products/lcd/tech/s2_3.html, in some form no later than Jul. 11, 2012.

Gurski, J., et al., "Display Technology Overview" Lytica White Paper; Jul. 1, 2005.

International Search Report and Written Opinion dated Mar. 18, 2014, received in International Application No. PCT/US2013/040158.

Okahata, et al., "A DNA-lipid complex soluble in organic solvents." Journal of the Chemical Society, Chemical Communications, Issue 18, pp. 1339-1341 (1992).

Okahata, Y., "Making functional Films from Salmon Sperm DNA, JST Seeds New Technology Presentation Meetings," accessed at http://jstshingi.jp/abst/p/07/jst/05/0507.pdf, pp. 1-25 (Oct. 18, 2007).

Okahata, Y., et al. "Oriented thin films of a DNA lipid complex" Thin Solid Films vols. 284-285, Sep. 15, 1996, pp. 6-8.

Irradiation

Press

DISPLAY DEVICES INCLUDING ORIENTED NUCLEIC ACID LAYERS AND METHODS OF MAKING AND USING THE SAME

CROSS-REFERENCE TO RELATED APPLICATION

This application is the U.S. national phase entry under 35 U.S.C. § 371 of PCT/US2013/040158, filed May 8, 2013, the entire disclosure of which is hereby incorporated by reference herein.

BACKGROUND

Unless otherwise indicated herein, the materials described in this section are not prior art to the claims in this application and are not admitted to be prior art by inclusion in this section.

Many display devices use polarized light to control the intensity and color of light emitted by the display device. For example, liquid crystal displays typically include two polarizing layers and a liquid crystal layer between the polarizing layers. The orientation of liquid crystal molecules in the liquid crystal layer can be modulated by applying a voltage, which in turn controls an amount of light transmitted through both of the polarizing layers.

Liquid crystal displays can also include a conductive layer having electrodes configured to apply a voltage to the liquid crystal layer. Thin film transistors (TFT) are one example of a conductive layer used to apply a voltage to the liquid crystal layer. The conductive layer is typically positioned between a polarizing layer and the liquid crystal layer.

Many display devices can include a color filtering layer to control the color of light emitted from the display device. The color filtering layer can be a separate layer from the polarizing layers and conductive layers. Traditionally, additional functionality is achieved by adding additional and/or more complex structures to the system.

SUMMARY

In some embodiments, a display device is provided. The device can include a first oriented nucleic acid layer comprising nucleic acid oriented in a first direction, a polarizing layer, and a light-orienting layer disposed between the first oriented nucleic acid layer and the polarizing layer.

In some embodiments, a method of making a color filtering layer is provided. The method can include selectively applying a first pigment to a first regions of an oriented nucleic acid layer comprising nucleic acid oriented in a first direction, selectively applying a second pigment to a second regions of the oriented nucleic acid layer, and selectively applying a third pigment to a third regions of the oriented nucleic acid layer.

In some embodiments, a color filtering layer is provided. The layer can include an oriented nucleic acid layer comprising nucleic acid oriented in a first direction, a first pigment disposed in first regions of the oriented nucleic acid layer, a second pigment disposed in second regions of the oriented nucleic acid layer, and a third pigment disposed in third regions of the oriented nucleic acid layer, wherein the first regions, the second regions, and the third regions together form alternating bands extending along a surface of the oriented nucleic acid layer.

In some embodiments, a method of using a display device is provided. The method can include providing the display device. The display device can include a first oriented nucleic acid layer comprising nucleic acid oriented in a first direction, a polarizing layer, and a liquid crystal layer, wherein the light-orienting layer is disposed between the first oriented nucleic acid layer and the polarizing layer, applying light to one side of the display device, and adjusting a voltage across the liquid crystal layer to modulate an amount of the applied light transmitted through the display device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
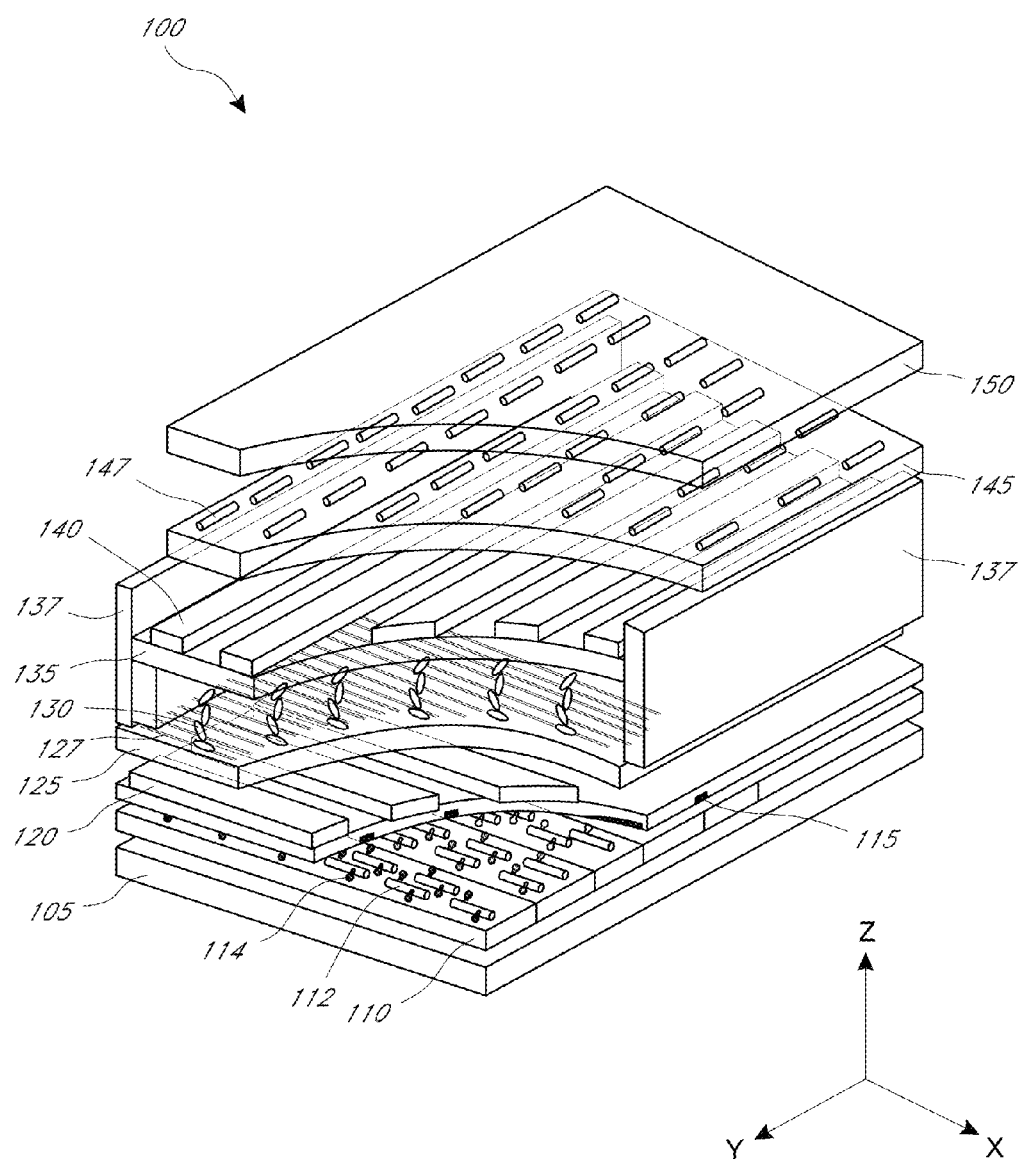
FIG. 1 is schematic showing some embodiments of a display device that is within the scope of the present application.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Some embodiments disclosed herein include a display device. The display device may include a first oriented nucleic acid layer having nucleic acid oriented in a first direction, a polarizing layer, and a light-orienting layer disposed between the first oriented nucleic acid layer and the polarizing layer. In some embodiments, the oriented nucleic acid layer can function as a polarizing layer, removing the need for a separate polarizing layer.

FIG. 1 is schematic showing some embodiments of a display device that are within the scope of the present application. Display device 100 can include first transparent protective layer 105 (for example, a glass or a polycarbonate film) and first oriented nucleic acid layer 110 disposed on one side of transparent protective layer 105. First oriented nucleic acid layer 110 can include oriented nucleic acid 112 which is oriented in a first direction (for example, oriented along the x-axis as depicted in FIG. 1) and configured to polarize light applied to first oriented nucleic acid layer 110. First oriented nucleic acid layer 110 may also optionally include one or more pigments 114 configured to filter one or more colors when visible light is applied to first oriented nucleic acid layer 110. Pigments 114 can be intercalated (but can also and/or alternatively be associated in other manners, such as covalent bonds, hydrogen bonds, van der waals, etc.) between oriented nucleic acid 112. First oriented nucleic acid layer 110 may include two or more regions configured to filter different colors. For example, first oriented nucleic acid layer 110 can include three different regions that are configured to transmit red, green, or blue.

First oriented nucleic acid layer 110 can be disposed between transparent protective layer 105 and black matrix layer 115 configured to block light that may leak between regions of first nucleic acid layer 110 having different color filtering properties (for example, regions with different pigment compositions).

Black matrix layer 115 can be disposed between first transparent conductive layer 120 and first oriented nucleic acid layer 110. As an example, first transparent conductive layer 120 may include parallel electrodes formed from one or more of ZnO, ZnTiO, $SnO_2$, or $In_2O_3$. In some embodiments, first transparent conductive layer 120 may be an active matrix layer (for example, a thin film transistor (TFT)). In some embodiments, first transparent conductive layer 120 may be a thin conductive film without separate electrodes.

First transparent conductive layer 120 can be disposed between first alignment layer 125 and black matrix layer 115. First alignment layer 125 may include aligned microstructures 127 which are configured to align liquid crystal molecules. For example, first alignment layer 125 may include a polyimide film having aligned microstructures formed by standard rubbing techniques. U.S. Pat. No. 7,871,838 suggests procedures for preparing various alignment layers that may be used to prepare first alignment layer 125.

Liquid crystal molecules 130 may form a liquid crystal layer disposed between alignment layer 125 and an interlayer film 135. Liquid crystal molecules 130 can generally be any suitable molecules that can be configured to reorient light. The liquid crystal molecules can be, for example, twisted nematic liquid crystals, such as cyano-biphenyls. In some embodiments, the liquid crystal particles can include titanium oxide particles. In some embodiments, a different display device format (a non-liquid crystal format) can be employed. Thus, in any of the embodiments provided herein, "e-ink" or electronic paper can instead replace the liquid crystal format. Spacer elements (not shown) may also be optionally disposed between alignment layer 125 and interlayer film 135.

In some embodiments, a second alignment layer may be included (not shown) and may also include aligned microstructures (not shown) which are configured to align liquid crystal molecules. The second alignment layer (not shown), may have the same or different configuration than first alignment layer 125. For example, it may include different or the same materials than first alignment layer 125. As another example, second alignment layer may have aligned microstructures (not shown) that are generally parallel or generally perpendicular to aligned microstructures 127 in first alignment layer 125. In some embodiments, the second alignment layer is generally 90 degree off from the first alignment layer (for example, the first can be perpendicular to the second alignment layer in the xy plane).

Liquid crystal molecules 130 may be maintained between first alignment layer 125 and the interlayer film 135 by sealant 137. U.S. Patent Publication No. 2005/0181145 suggests suitable sealant materials and procedures that may be used to form sealant 137. Other suitable sealant materials and procedures may be used without limitation.

Interlayer film 135 can be disposed between second transparent conductive layer 140 and liquid crystal molecules 130. Second transparent conductive layer 140 and first transparent conductive layer 120 may be together configured to apply a voltage to reorient at least a portion of liquid crystal molecules 130. The applied voltage may therefore control an amount of light transmitted through polarizing layers of display device 100. Second transparent conductive layer 140 may, for example, include parallel electrodes formed from one or more of ZnO, ZnTiO, $SnO_2$, or $In_2O_3$. The parallel electrodes in second transparent conductive layer 140 may be perpendicular to parallel electrodes in first transparent conductive layer 120. In some embodiments, second transparent conductive layer 140 may be an active matrix layer (for example, a thin film transistor (TFT)). In some embodiments, second transparent conductive layer 140 may be an active matrix layer and first conductive layer 120 may be a thin conductive film without separate electrodes. In some embodiments, second transparent conductive layer 140 may be a thin conductive film without separate electrodes and first conductive layer 120 may be an active matrix layer.

Second oriented nucleic acid layer 145 can be disposed between second transparent protective layer 150 (for example, a glass or a polycarbonate film) and second transparent conductive layer 140. Second oriented nucleic acid layer 145 can include oriented nucleic acid 147 which is oriented in a second direction (for example, oriented along the y-axis as depicted in FIG. 1) and configured to polarize light applied to second oriented nucleic acid layer 145. Oriented nucleic acid 147 in second oriented nucleic acid layer 145 may be oriented in the second direction that is generally perpendicular to the first direction of orientation for oriented nucleic acid 112 in first oriented nucleic acid layer 110. Accordingly, light that is polarized by first oriented nucleic acid layer 110 may not transmit through second oriented nucleic acid layer 145 unless the polarized light is reoriented by liquid crystal molecules 130. Thus, in some embodiments, a voltage applied between first transparent conductive layer 120 and second conductive layer 140 may modulate an alignment of liquid crystal molecules 130, which in turn controls an intensity and location of light transmitted through display device 100.

The oriented nucleic acid layer (for example, first oriented nucleic acid layer 110 and second oriented nucleic acid layer 145 as depicted in FIG. 1) can generally contain any nucleic acid that may be configured to polarize visible light. The oriented nucleic acid layer may, for example, include one or more of single-stranded DNA, double-stranded DNA, triple-stranded DNA, or RNA. In some embodiments, the oriented nucleic acid layer includes double-stranded DNA. U.S. Patent Publication No. 2007/0132925 provides examples of DNA films that can be used, in light of the present disclosure, as oriented nucleic acid layers in the display device. Other oriented nucleic acid layers may be used without limitation.

The pigments in the oriented nucleic acid layer (for example, first oriented nucleic acid layer 110 as depicted in FIG. 1) can be selected based on the desired color to be emitted by the display device. The pigments may be configured to emit, for example, one or more of red, blue, green, cyan, magenta, yellow, or black. In some embodiments, the oriented nucleic acid layer can have three or more pigments (for example, three, four, five, six, or more pigments). For example, the oriented nucleic acid lay can include red, blue, and green pigments. The pigments may be arranged in alternating bands within the oriented nucleic acid layer that are aligned with the black matrix layer (for example, bands in first oriented nucleic acid layer 110 are parallel and aligned with black matrix layer 115 as depicted in FIG. 1). The bands together with the black matrix layer may together form pixels for emitting a desire color. The bands may optionally be oriented generally parallel to the orientation of the oriented nucleic acid in the oriented nucleic acid layer. For example, the first oriented nucleic acid layer may include nucleic acid oriented in a first direction and also contain alternating bands having different pigments that are oriented in the first direction. The number of bands in the oriented nucleic acid layer can be, for example, at least about 100, at least about 200, at least about 300, at least about 400, at least about 500, at least about 600, at least about 700, at least about 800, at least about 900, or at least about 1000.

The skilled artisan, guided by the teachings of the present application, will appreciate that the oriented nucleic acid layer containing pigments (for example, first oriented nucleic acid layer 110 as depicted in FIG. 1) may function as both a polarizing layer and a color filtering layer. Thus, in some embodiments, the display device does not include an additional color filtering layer. Similarly, the first oriented nucleic acid layer and the second oriented nucleic acid layer may both function as a polarizing layer. Thus, in some embodiments, the display device does not include an additional layer configured to polarize light. In some embodiments, the display device does not include an additional layer configured to polarize light, and the display device does not include an additional color filtering layer.

Figure 2:
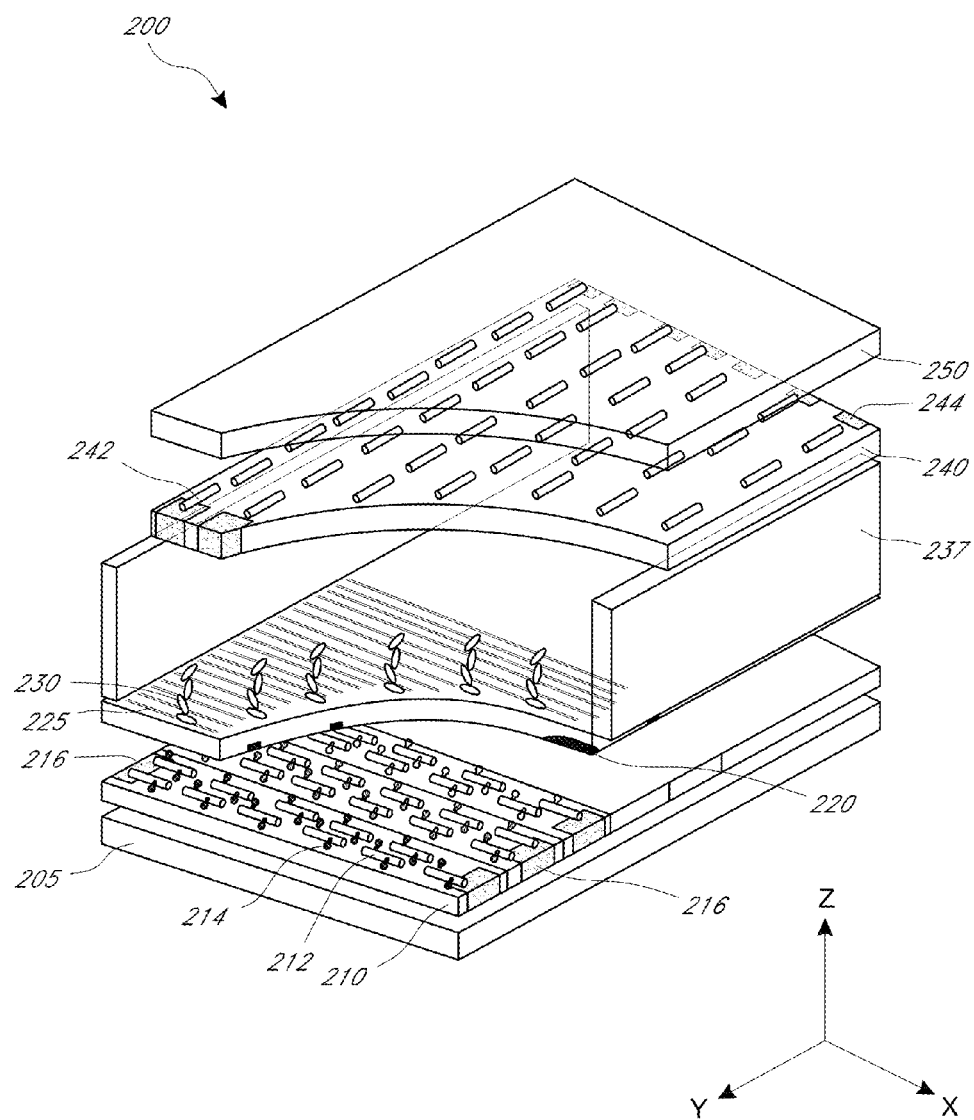
FIG. 2 is schematic showing some embodiments of a display device that is within the scope of the present application.

FIG. 2 is schematic showing some embodiments of a display device that are within the scope of the present application. Display device 200 includes first oriented nucleic acid layer 210 disposed between black matrix layer 220 and transparent protective layer 205. Black matrix layer 220 and transparent protective layer 205 may have the same properties as black matrix layer 115 and transparent protective layer 105 as described above with regard to display device 100.

First oriented nucleic acid layer 210 can include oriented nucleic acid 212 which is oriented in a first direction (for example, oriented along the x-axis as depicted in FIG. 2) and configured to polarize light applied to first oriented nucleic acid layer 210. First oriented nucleic acid layer 210 may also optionally include one or more pigments 214 configured to filter one or more colors when visible light is applied to first oriented nucleic acid layer 210. Pigments 214 can be configured in the same way as described above with regard to pigments 114 in first oriented nucleic acid layer 110 in display device 100. For example, as shown in FIG. 2, pigments 214 can be arranged in parallel alternating bands that are configured to produce red, green, or blue light. The bands can be aligned with black matrix 220.

First oriented nucleic acid layer 210 can also include first electrode pairs 216 which are configured to apply a voltage across first oriented nucleic acid layer 210. First electrode pairs 216 have electrodes near opposing edges of first oriented nucleic acid layer 210. The opposing edges extend perpendicular to the first direction in which oriented nucleic acid 212 is oriented (for example, the edges extend in the y-axis, while oriented nucleic acid 212 extends in the x-axis as shown in FIG. 2). First electrode pairs 216 may therefore be configured to apply a voltage that produces a current along the first direction that oriented nucleic acid 212 is oriented. First electrode pairs 216 can optionally be aligned with the alternating bands of pigments 214. For example, display device 200 may include nine alternating bands of red, green, and blue pigment, and nine electrode pairs. The number of electrode pairs can be, for example, one, at least about 100, at least about 200, at least about 300, at least about 400, at least about 500, at least about 600, at least about 700, at least about 800, at least about 900, or at least about 1000, including any range between any of the two preceding values and any range above any of the preceding values. In some embodiments, the number of electrode pairs is equal to or about the same as the number of alternating bands.

Display device 200 can also include first alignment layer 225, liquid crystal molecules 230, an interlayer film (not shown in FIG. 2 for clarity), and sealant 237. These components can have the same configuration as first alignment layer 125, liquid crystal molecules 130, an interlayer film 135, and sealant 137 in display device 100, respectively.

Second oriented nucleic acid layer 240 can be disposed between transparent protective layer 250 and the interlayer film. Second oriented nucleic acid layer 240 can include oriented nucleic acid 242 which is oriented in a second direction (for example, oriented along the y-axis as depicted in FIG. 2) and configured to polarize light applied to second oriented nucleic acid layer 240. Oriented nucleic acid 242 in second oriented nucleic acid layer 240 may be oriented in the second direction that is generally perpendicular to the first direction of orientation for oriented nucleic acid 212 in first oriented nucleic acid layer 210. Accordingly, light that is polarized by first oriented nucleic acid layer 210 may not transmit through second oriented nucleic acid layer 240 unless the polarized light is reoriented by liquid crystal molecules 230.

Second oriented nucleic acid layer 240 can also include second electrode pairs 244 which are configured to apply a voltage across second oriented nucleic acid layer 240. Second electrode pairs 244 have electrodes near opposing edges of second oriented nucleic acid layer 240. The opposing edges extend perpendicular to the second direction in which oriented nucleic acid 242 is oriented (for example, the edges extend in the x-axis, while oriented nucleic acid 242 extends in the y-axis as shown in FIG. 2). Second electrode pairs 244 may therefore be configured to apply a voltage that produces a current along the second direction which oriented nucleic acid 242 is oriented. The number of electrode pairs can be, for example, one, at least about 100, at least about 200, at least about 300, at least about 400, at least about 500, at least about 600, at least about 700, at least about 800, at least about 900, or at least about 1000. The number of electrode pairs in second oriented nucleic acid layer 240 can be the same or different than the number of electrode pairs in first oriented nucleic acid layer 210.

First electrode pairs 216 in first oriented nucleic acid layer 210 and second electrode pairs 244 in second oriented nucleic acid layer 240 may be together configured to apply a voltage that is effective to reorient liquid crystal molecules 230. The voltage across various electrode pair may be synchronized to reorient liquid crystal molecules 230. This may modulate an amount and color of light emitted from display device 200. Accordingly, the skilled artisan, guided by the teachings of the present application, will appreciate that first oriented nucleic acid layer 210 and second oriented nucleic acid layer 240 can function as conductive layers that are used modulate the orientation of liquid crystal molecules 230, which in turn controls an amount light emitted. Thus, in some embodiments, the display device does not include an additional conducting layer.

Thus, in some embodiments, a voltage applied between first oriented nucleic acid layer 210 and second oriented nucleic acid layer 240 may modulate an alignment of liquid crystal molecules 230, which in turn controls an intensity and location of light transmitted through display device 200. Accordingly, first oriented nucleic acid layer 210 may function a conductive layer, polarizing layer, and color filtering layer, while second oriented nucleic acid layer 240 may function as a conductive layer and a polarizing layer. Thus, in some embodiments, the display device does not include an additional layer configured to polarize light, the display device does not include an additional color filtering layer, and the display device does not include an additional conductive layer.

The oriented nucleic acid layer (for example, first oriented nucleic acid layer 210 and second oriented nucleic acid layer 240 as depicted in FIG. 2) may optionally include a metal dopant to increase conductivity. The increased conductivity may improve control of reorienting the liquid crystal molecules when applying a voltage to the electrode pairs. The metal dopant can be, for example, Ca and/or Mg. In some embodiments, the metal dopant can be any metal from Group II, such as Be, Sr, Ba, or Ra.

Although various embodiments have been described for the display device (for example, display device 100 depicted in FIG. 1 and display device 200 depicted in FIG. 2), various modifications can be made that are within the scope of the present application. In some embodiments, the display device may include a separate color filtering layer. The first oriented nucleic acid layer (for example, first oriented nucleic acid layer 210) may not function as a color filtering layer and therefore can be substantially free of pigments that modulate color filtering properties. The location of the separate color filtering layer is not particularly limited, and can be any location that will permit filtering light before it is emitted from the display device. The black matrix layer (for example, black matrix layer 220 in display device 200) can be adjacent to the color filtering layer, and therefore the black matrix layer may be at various locations in the display device.

In some embodiments, the display device may have only one oriented nucleic acid layer that functions as a conductive layer. That is, only one of the first oriented nucleic acid layer or the second oriented nucleic acid layer may include electrode pairs. For example, first oriented nucleic acid layer 210 may not include first electrode pairs 216, but rather a separate conductive layer may be disposed between black matrix layer 220 and first alignment layer 225. As another example, second oriented nucleic acid layer 240 may not include second electrode pairs 244, but rather a separate conductive layer may be disposed between the interlayer film and second oriented nucleic acid layer 240.

In some embodiments, the display device may have only one oriented nucleic acid layer. For example, second oriented nucleic acid layer 240 may be replaced by a standard polarizing layer (for example, stretched polyvinylalcohol (PVA) with iodine) and conducting layer (for example, an $In_2O_3$ layer). As another example, first oriented nucleic acid layer 210 may be replaced by a standard polarizing layer, conducting layer, and color filtering layer.

The oriented nucleic acid layers (for example, first oriented nucleic acid layer 110 and second oriented nucleic acid layer 145 as depicted in FIG. 1), in some embodiments, may only function as a polarizing layer. Thus, the display device may include, for example, two separate conducting layers and a separate color filtering layer.

The display device may also include a light source. The location of the light source may vary, and can be generally configured to apply light that can be transmitted through the polarizing layers and the liquid crystal layer. As an example, transparent protective layer 205 can be disposed between a light source and first oriented nucleic acid layer 210, where the light source applies light that is transmitted through transparent protective layer 205. The light source may, for example, be configured to emit visible, white light.

Some embodiments disclosed herein include a method using a display device. The method may include providing a display device, applying light to one side of the display device, and adjusting a voltage across a light-orienting layer in the display device to modulate an amount of the applied light transmitted through the display device. The display device can be any of those display devices disclosed in the present application. For example, the display device can be display device 100 as depicted in FIG. 1 or display device 200 as depicted in FIG. 2. In some embodiments, the display device can include: a first oriented nucleic acid layer comprising nucleic acid oriented in a first direction; a polarizing layer; and a liquid crystal layer, where the light-orienting layer is disposed between the first oriented nucleic acid layer and the polarizing layer.

Adjusting the voltage across the light-orienting layer (for example, first alignment layer 125 and liquid crystal molecules 130 may together form a light-orienting layer) may, in some embodiments, include adjusting a voltage applied to two or more electrode pairs in the first oriented nucleic acid layer. For example, adjusting the voltage can include adjust a voltage across first electrode pairs 216 in first oriented nucleic acid layer 210. Adjusting the voltage across the light-orienting layer may, in some embodiments, include adjusting a voltage applied to two or more electrode pairs in the second oriented nucleic acid layer. For example, adjusting the voltage can include adjusting a voltage across second electrode pairs 244 in second oriented nucleic acid layer 240.

Some embodiments disclosed herein include a color filtering layer. The color filtering layer may, in some embodiments, include an oriented nucleic acid layer comprising nucleic acid oriented in a first direction; a first pigment disposed in first regions of the oriented nucleic acid layer; a second pigment disposed in second regions of the oriented nucleic acid layer; and a third pigment disposed in third regions of the oriented nucleic acid layer, where the first regions, the second regions, and the third regions together form alternating bands extending along a surface of the oriented nucleic acid layer. As an example, the color filtering layer can be the same as first nucleic acid layer 110 in display device 100 or first oriented nucleic acid layer 210 in display device 200.

The color filtering layer may generally have the same properties as described above with regard to first oriented nucleic acid layer 110 in display device 100. In some embodiments, the alternating bands of pigment extend in the first direction. In some embodiments, the color filtering layer can be configured to polarize visible light that is transmitted through the color filtering layer. In some embodiments, the color filtering layer may include a metal dopant, such as Ca or Mg.

The color filtering layer may optionally include electrode pairs that are electrically coupled to opposite sides of the color filtering layer. For example, the color filtering layer may have the same configuration as first oriented nucleic acid layer 210 in display device 200. In some embodiments, the electrodes can be disposed near opposing edges that extend perpendicular to the first direction in which the nucleic acid is oriented.

The pigments in the color filtering layer are not particularly limited, and can be selected based on the desired colors to be transmitted. Generally, any of the pigments discussed above with regard to the oriented nucleic acid layers in the display device may be used. In some embodiments, the first pigment is red, the second pigment is green, and the third pigment is blue.

Some embodiments disclosed herein include a method of making a color filtering layer. The method may be used, for example, to prepare any of the color filtering layers disclosed in the present application (for example, first oriented nucleic acid layer 210 in display device 200). The method may include: selectively applying a first pigment to a first regions of an oriented nucleic acid layer comprising nucleic acid oriented in a first direction; selectively applying a second pigment to a second regions of the oriented nucleic acid layer; and selectively applying a third pigment to a third regions of the oriented nucleic acid layer. The pigment can be applied, for example, using one or more of inkjet, roll-to-roll, nano/micro-imprinting, microelectromechanical systems, or semiconductor fabrication processing.

Figure 3A:
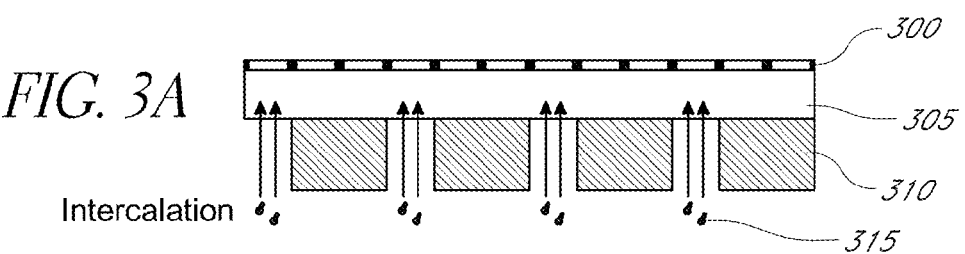
FIGS. 3A-3F show some embodiments of a method of making a color filtering layer that is within the scope of the present application.
Figure 3B:
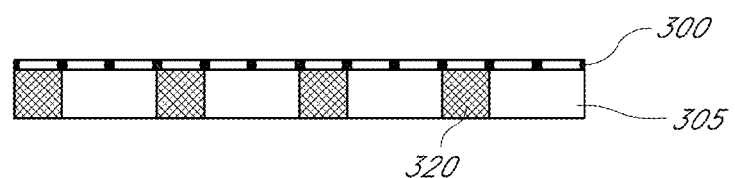

FIGS. 3A-3F show some embodiments of a method of making a color filtering layer that is within the scope of the present application. In FIG. 3A, black matrix layer 300 has oriented nucleic acid layer 305 formed on one side. First patterned photoresist 310 can be selectively applied to a side of oriented nucleic acid layer 305 opposite black matrix layer 300. First patterned photoresist 310 can be formed, for example, using photolithography techniques. First pigment 315 may then be selectively applied to exposed regions of oriented nucleic acid layer 305 (for example, by immersion, spraying, and the like). First patterned photoresist 310 can be removed, for example, using an appropriate solvent to yield oriented nucleic acid layer 305 having first pigmented regions 320 as shown in FIG. 3B. First pigmented regions 320 may have a width that corresponds to the width of the matrix in black matrix layer 300. In some embodiments, first pigmented regions 320 is applied to form two or more parallel bands that extend generally parallel a direction of orientation for the nucleic acid in orient nucleic acid layer 305. In some embodiments, first pigmented regions 320 is red.

Figure 3C:
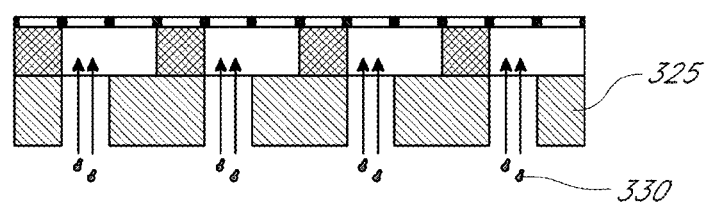
Figure 3D:
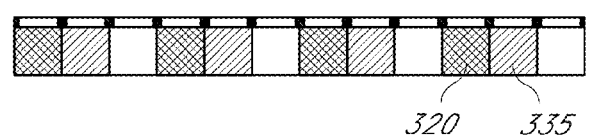

At FIG. 3C, second patterned photoresist 325 can be selectively applied to a side of oriented nucleic acid layer 305 opposite black matrix layer 300. Second patterned photoresist 325 can be formed, for example, using photolithography techniques. Second pigment 330 may then be selectively applied to exposed regions of oriented nucleic acid layer 305. Second patterned photoresist 325 can be removed, for example, using an appropriate solvent to yield oriented nucleic acid layer 305 having first pigmented regions 320 and second pigmented regions 335 as shown in FIG. 3D. Second pigmented regions 335 may have a width that corresponds to the width of the matrix in black matrix layer 300. In some embodiments, second pigmented regions 335 is applied to form two or more parallel bands that extend generally parallel a direction of orientation for the nucleic acid in orient nucleic acid layer 305. In some embodiments, the number of regions in second pigmented regions 335 is equal to or about the same as the number of regions in first pigmented regions 320. In some embodiments, second pigmented regions 335 is green.

Figure 3E:
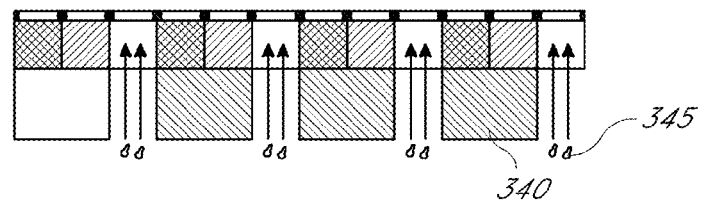
Figure 3F:
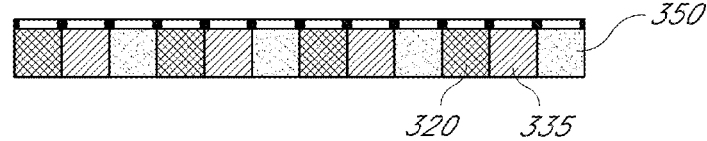

At FIG. 3E, third patterned photoresist 345 can be selectively applied to a side of oriented nucleic acid layer 305 opposite black matrix layer 300. Third patterned photoresist 340 can be formed, for example, using photolithography techniques. Third pigment 345 may then be selectively applied to exposed regions of oriented nucleic acid layer 305. Third patterned photoresist 340 can be removed, for example, using an appropriate solvent to yield the final color filtering layer. The final color filtering layer includes oriented nucleic acid layer 305 having first pigmented regions 320, second pigmented regions 335, and third pigmented regions 350 as shown in FIG. 3F. Third pigmented regions 350 may have a width that corresponds to the width of the matrix in black matrix layer 300. In some embodiments, third pigmented regions 335 is applied to form two or more parallel bands that extend generally parallel a direction of orientation for the nucleic acid in orient nucleic acid layer 305. In some embodiments, the number of regions in second pigmented regions 335 is equal to or about the same as the number of regions in third pigmented regions 335. In some embodiments, third pigmented regions 350 is blue.

Figure 4A:
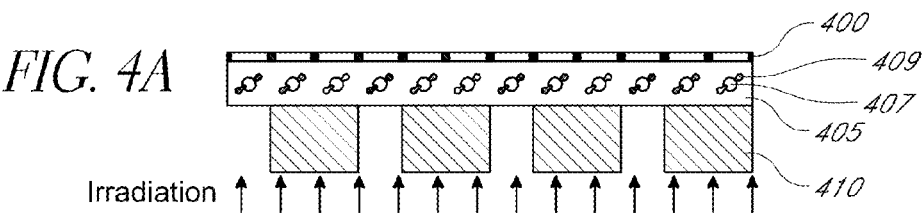
FIGS. 4A-4I show some embodiments of a method of making a color filtering layer that is within the scope of the present application.
Figure 4B:
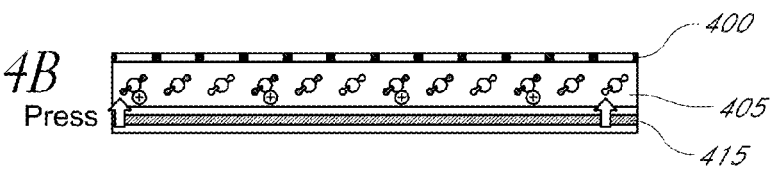
Figure 4C:
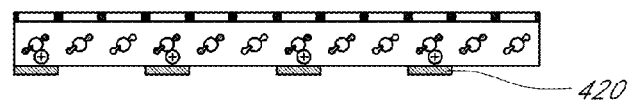

FIGS. 4A-4I show some embodiments of a method of making a color filtering layer that are within the scope of the present application. In FIG. 4A, black matrix layer 400 has oriented nucleic acid layer 405 formed on one side. Oriented nucleic acid layer 405 includes oriented nucleic acid 407 and intercalated photosensitive pigment 409. First patterned photoresist 410 can be selectively applied to a side of oriented nucleic acid layer 405 opposite black matrix layer 400. First patterned photoresist 410 can be formed, for example, using photolithography techniques. Exposed portions of oriented nucleic acid layer 405 can be exposed to radiation to charge the exposed portions. First patterned photoresist 410 can be removed and then first toner 415 pressed to the surface of oriented nucleic acid layer 405 as shown in FIG. 4B. First toner 415 can selectively adhere to the charged regions to form first pigmented regions 420 as shown in FIG. 4C. First pigmented regions 420 may have a width that corresponds to the width of the matrix in black matrix layer 400. In some embodiments, first pigmented regions 420 forms two or more parallel bands that extend generally parallel a direction of orientation for oriented nucleic acid 407. In some embodiments, first pigmented regions 420 is red. In some embodiments, the first pigments regions 420 is cyan, magenta, yellow, or black.

Figure 4D:
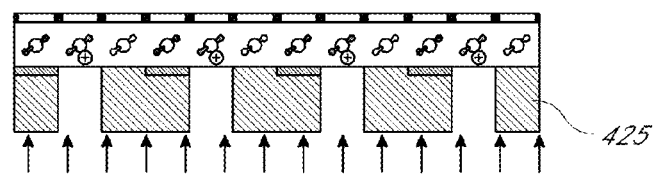
Figure 4E:
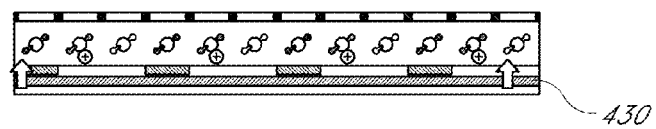
Figure 4F:
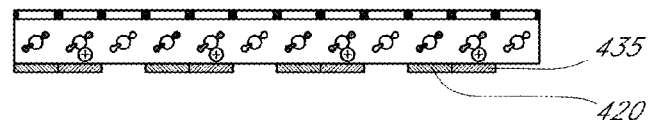

At FIG. 4D, second patterned photoresist 425 can be selectively applied to a side of oriented nucleic acid layer 405 opposite black matrix layer 400. Second patterned photoresist 425 can be formed, for example, using photolithography techniques. Exposed portions of oriented nucleic acid layer 405 can be exposed to radiation to charge the exposed portions. Second patterned photoresist 425 can be removed and then second toner 430 pressed to the surface of oriented nucleic acid layer 405 as shown in FIG. 4E. Second toner 430 can selectively adhere to the charged regions to form second pigmented regions 435 as shown in FIG. 4F. In some embodiments, second pigmented regions 435 forms two or more parallel bands that extend generally parallel a direction of orientation for oriented nucleic acid 407. In some embodiments, the number of regions in second pigmented regions 435 is equal to or about the same as the number of regions in first pigmented regions 420. In some embodiments, second pigmented regions 435 is green.

Figure 4G:
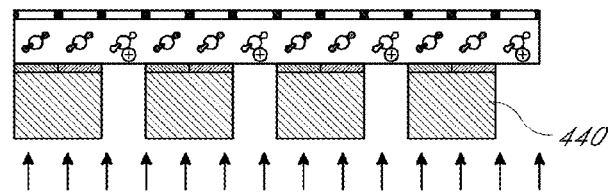
Figure 4H:
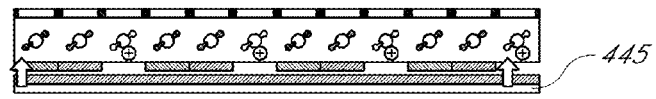
Figure 4I:
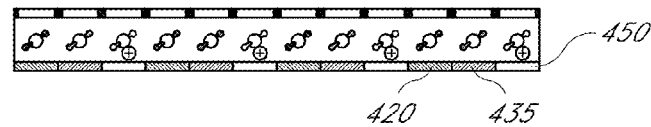

At FIG. 4G, third patterned photoresist 440 can be selectively applied to a side of oriented nucleic acid layer 405 opposite black matrix layer 400. Third patterned photoresist 440 can be formed, for example, using photolithography techniques. Exposed portions oriented nucleic acid layer 405 can be exposed to radiation to charge the exposed portions. Third patterned photoresist 440 can be removed and then third toner 445 pressed to the surface of oriented nucleic acid layer 405 as shown in FIG. 4H. Third toner 445 can selectively adhere to the charged regions to form third pigmented regions 450 to yield the color filtering layer as shown in FIG. 4I. In some embodiments, third pigmented regions 450 forms two or more parallel bands that extend generally parallel to the orientation for oriented nucleic acid 407. In some embodiments, the number of regions in second pigmented regions 435 is equal to or about the same as the number of regions in third pigmented regions 450. In some embodiments, third pigmented regions 450 is blue.

The method of forming the coloring filtering layer may also optionally include applying a metal dopant to the oriented nucleic acid layer. The metal dopant can be, for example, Ca or Mg. The metal dopant can be applied, for example, by immersion, spraying, coating, and the like. The metal dopant may be applied before or after forming pigmented regions in the oriented nucleic acid layer.

The method may, in some embodiments, include disposing two or more electrode pairs on the oriented nucleic acid layer. The electrode pairs can be formed using standard techniques, such as spin coating a conductive layer on regions of the oriented nucleic acid layer. The conductive layer may include a polymer, such as polyaniline, or a metal, such as gold.

The method may also include operations to incorporate the color filtering layer into a display device. For example, after forming the color filtering layer in FIG. 3F, a liquid crystal layer may disposed between a polarizing layer and the color filtering layer. In some embodiments, the liquid crystal layer may also be disposed between a first alignment layer and interlayer film (for example, having the configuration as shown in FIG. 1).

In some embodiments, the DNA film conducts electrons primarily along the DNA strands but not across (or between two parallel) DNA strands. Using this feature, in some embodiments, the top and bottom of first oriented nucleic acid layer 210 and second oriented nucleic acid layer 240 can be used as a transparent electrode. Referring FIG. 2, in some embodiments, the edge of the color filter is connected to an electrode 244. This electrode can apply voltage to, and across the length of, the oriented DNAs 242 and 212. Thus, the first oriented nucleic acid layer 210 and second oriented nucleic acid layer 240 can be employed as transparent electrodes. If the conductivity across the oriented DNAs 242 and 212 is not sufficient, metal can be doped to the film. In some embodiments, the metal doping can be conducted by non-electrolytic plating, deposition, or sputtering. In some embodiments, DNA films 210 and 240 with electrodes 201 can be used as a transparent electrode to reduce the need or size of transparent electrode and its interlayer film (FIG. 1).

In some embodiments, conventional glass coverings crack when compressive stress is applied to their surface. Strengthened glass coverings can be employed and include a compressive layer at the top and bottom of the glass in order to strengthen themselves. As provided herein, glass breaking can be suppressed by having compressive bi-layers. The thicknesses of the compressive layers are about 20 μm or ⅙ of the total thickness of the glass. Given the embodiments provided herein, the tensile layer can be substituted with two layers of oriented DNA complexes films (FIGS. 1, 110 and 145) to release stress in a plane along with the surface. Thus, in some embodiments, the thickness of the compressive bi-layers (first and second transparent protective layers 105 and 150) can be reduced due to having the tensile bi-layer of DNA films (first and second oriented nucleic acid layers 110 and 145).

In some embodiments, the DNA can be from any source. In some embodiments, the DNA can be Salmon DNA, calf thymus DNA, lambda phage DNA, *E. coli* DNA, sweetbread DNA, etc. In some embodiments, the polarizer and/or components in the filters provided herein need not include materials that require large amounts of greenhouse gas production, such as PET, PBT, PEN, and/or PVA.

With respect to the use of substantially any plural and/or singular terms herein, those having skill in the art can translate from the plural to the singular and/or from the singular to volume of wastewater can be received in the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

EXAMPLES

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Example 1

Method of Forming a DNA Film

A glass substrate is provided. An oriented DNA film is applied to the glass substrate by film elongation, or in the alternative hot pressing, or in the alternative the hot-roller method. The DNA can be artificially synthesized and can be a double stranded in nature. A patterned black matrix layer can be positioned over the oriented DNA film.

Example 2

Method of Fabricating a Color Filter Using DNA Films

Photoresist patterns are patterned onto the DNA film and black matrix layer of Example 1. The photoresist patterns are defined by lithography. A red pigment is intercalated into the DNA film by exposing the exposed portion of the DNA film to a red pigment solution. The photoresist pattern is removed.

A second photoresist pattern is patterned onto the above. A green pigment is intercalated into the DNA film by exposing the exposed portion of the DNA film to a green pigment solution The second photoresist pattern is removed.

A third photoresist pattern is patterned onto the above. A blue pigment is intercalated into the DNA film by exposing the exposed portion of the DNA film to a blue pigment solution. The third photoresist pattern is removed to provide a RGB color filter.

Example 3

Method of Incorporating the Color Filter into a Display Device

The above color filter is positioned beneath a first alignment layer that is associated with a liquid crystal layer. The DNA film in the color filter is associated with a series of electrode pairs (as depicted in FIG. 2) and these electrodes are put into electrical communication with the rest of a display device. A second layer of a DNA film, whose DNA molecules are oriented perpendicularly to the orientation of the DNA molecules in the first DNA film, is positioned on the opposite side of the pair of the alignment layers. A backlight is positioned such that it provides light through both DNA film layers.

Example 4

Method of Using the Color Filter

A display device is provided. The device includes a first oriented DNA layer that includes nucleic acid oriented in a first direction. The DNA in the DNA layer has a green dye intercalated within it, so the DNA layer also functions as a green color filter for the device. Furthermore, the DNA is aligned so as to function as the polarizing layer. The device also includes a light orienting liquid crystal layer. The device also includes a second oriented DNA layer, which is also configured to function as a polarizing layer. Both oriented DNA layers are configured to function as transparent electrodes. The light-orienting layer is disposed between the first DNA layer and the second DNA layer. Light is applied to a first side of the display device via a backlight. A voltage across the liquid crystal layer is adjusted to modulate the amount of the applied light that is transmitted through the display device. The voltage is adjusted via the first oriented DNA layer and the second oriented DNA layer. By selecting where light is transmitted, and coordinating it with areas on the display device that contain pigment of a desired color, one can selectively filter light through the pigmented sections. The presence of the oriented DNA layers, acts as a stress releasing layer, allowing the substrate layers supporting the other layers to be thinner. Furthermore, as the oriented DNA layers also function as a color filter, polarizing layer, and transparent electrodes, the thickness of the device is further reduced.

What is claimed is:
1. A display device comprising:
    a first oriented nucleic acid layer configured to polarize light and filter color, wherein the first oriented nucleic acid layer is oriented in a first direction;

a second oriented nucleic acid layer configured to polarize light, wherein the second oriented nucleic acid layer is oriented in a second direction, wherein the second direction is different from the first direction; and a light-orienting layer disposed between the first oriented nucleic acid layer and the second oriented nucleic acid layer.

2. The display device of claim 1, wherein the display device does not include additional layers configured to polarize light.

3. The display device of claim 1, wherein the first oriented nucleic acid layer comprises three or more pigments patterned within the first oriented nucleic acid layer.

4. The display device of claim 3, wherein the three or more pigments are patterned as alternating bands that extend along a surface of the first oriented nucleic acid layer.

5. The display device of claim 4, wherein the alternating bands of each pigment extend in the first direction.

6. The display device of claim 4, further comprising three or more first electrode pairs, wherein each of the three or more first electrode pairs is electrically coupled to opposite ends of the alternating bands of each pigment in the first oriented nucleic acid layer.

7. The display device of claim 6, wherein the first oriented nucleic acid layer further comprises a metal dopant configured to increase conductivity of the first oriented nucleic acid layer.

8. The display device of claim 3, wherein the three or more pigments comprise a red pigment, a blue pigment, and a green pigment.

9. The display device of claim 1, further comprising two or more first electrode pairs, wherein each of the two or more first electrode pairs is electrically coupled to opposite ends of the first oriented nucleic acid layer, wherein each of the two or more first electrode pairs are aligned in the first direction.

10. The display device of claim 1, wherein the first oriented nucleic acid layer is configured to polarize light that is transmitted through the first oriented nucleic acid layer.

11. The display device of claim 1, wherein the display device is configured to polarize light that is transmitted through the display device.

12. The display device of claim 1, further comprising two or more second electrode pairs, wherein each of the two or more second electrode pairs is electrically coupled to opposite ends of the second oriented nucleic acid layer, and wherein each of the two or more second electrode pairs is aligned in the second direction.

13. The display device of claim 1, further comprising a first transparent conducting layer, wherein the first transparent conducting layer is disposed between the light-orienting layer and the first oriented nucleic acid layer.

14. The display device of claim 1, further comprising a first transparent protective layer, wherein the first oriented nucleic acid layer is disposed between the first transparent protective layer and the light-orienting layer.

15. The display device of claim 14, further comprising a second transparent conducting layer, wherein the second transparent conducting layer is disposed between the light-orienting layer and the second oriented nucleic acid layer.

16. The display device of claim 1, further comprising a light source, wherein the second oriented nucleic acid layer is disposed between the light source and the light-orienting layer.

17. The display device of claim 1, wherein the light-orienting layer comprises a first alignment layer, an interlayer film, and a liquid crystal layer disposed between the first alignment layer and the interlayer film.

18. The display device of claim 1, wherein the first oriented nucleic acid layer comprises one or more of single-stranded deoxyribonucleic acid (DNA), double-stranded DNA, triple stranded DNA, or ribonucleic acid (RNA).

19. The display device of claim 1, wherein the first oriented nucleic acid layer comprises double-stranded DNA.

20. A method comprising:
providing a display device that comprises:
a first oriented nucleic acid layer configured to polarize light and filter color, wherein the first oriented nucleic acid layer is oriented in a first direction;
a second oriented nucleic acid layer configured to polarize light, wherein the second oriented nucleic acid layer is oriented in a second direction, and wherein the second direction is different from the first direction; and
a liquid crystal layer, wherein the liquid crystal layer comprises a light-orienting layer disposed between the first oriented nucleic acid layer and the second oriented nucleic acid layer;
applying light to one side of the display device; and
adjusting a voltage across the liquid crystal layer to modulate an amount of the applied light transmitted through the display device.

* * * * *

UNITED STATES PATENT AND TRADEMARK OFFICE
CERTIFICATE OF CORRECTION

Page 1 of 1

PATENT NO. : 9,933,647 B2
APPLICATION NO. : 14/786473
DATED : April 3, 2018
INVENTOR(S) : Seike It is certified that error appears in the above-identified patent and that said Letters Patent is hereby corrected as shown below:

In the Specification

In Column 5, Line 60, delete "black matrix 220." and insert -- black matrix layer 220. --, therefor.

In Column 10, Line 8, delete "Third pigment 345 may" and insert -- Third pigment may --, therefor.

In Column 11, Line 48, delete "electrode 244." and insert -- second electrode pairs 244. --, therefor.

In Column 12, Line 2, delete "(FIGS. 1," and insert -- (FIG. 1, --, therefor.

Signed and Sealed this
Twenty-second Day of May, 2018

Andrei Iancu
*Director of the United States Patent and Trademark Office*